United States Patent
Topf et al.

(10) Patent No.: US 7,456,226 B2
(45) Date of Patent: Nov. 25, 2008

(54) METHOD AND INSTALLATION FOR PRODUCING LIQUID ENERGY CARRIERS FROM A SOLID CARBON CARRIER

(75) Inventors: Norbert Topf, Dresden (DE); Guenter Liebisch, Dresden (DE)

(73) Assignees: Sascha Schroeder, Dresden (DE); Ulrike Topf, Dresden (DE)

( * ) Notice: Subject to any disclaimer, the term of this patent is extended or adjusted under 35 U.S.C. 154(b) by 0 days.

(21) Appl. No.: 10/582,699

(22) PCT Filed: Dec. 13, 2004

(86) PCT No.: PCT/DE2004/002766

§ 371 (c)(1),
(2), (4) Date: Nov. 21, 2006

(87) PCT Pub. No.: WO2005/056737

PCT Pub. Date: Jun. 23, 2005

(65) Prior Publication Data

US 2007/0129449 A1    Jun. 7, 2007

(30) Foreign Application Priority Data

Dec. 13, 2003 (DE) ................................. 103 58 507

(51) Int. Cl.
*C07C 27/00* (2006.01)
(52) U.S. Cl. .................. 518/705; 518/700; 518/702; 518/703; 518/704
(58) Field of Classification Search .......... 518/700–705
See application file for complete search history.

(56) References Cited

U.S. PATENT DOCUMENTS

| | | | |
|---|---|---|---|
| 2002/0087037 A1 * | 7/2002 | Kaneko et al. | 568/913 |
| 2002/0112403 A1 | 8/2002 | Pope et al. | |
| 2002/0134019 A1 | 9/2002 | Paisley | |
| 2003/0083390 A1 * | 5/2003 | Shah et al. | 518/702 |
| 2004/0079087 A1 | 4/2004 | Chandran et al. | |
| 2004/0182294 A1 | 9/2004 | Hahn et al. | |

OTHER PUBLICATIONS

Olsen et al, Unit processes and Principles of Chemical Engineering, D. Van Nostrand Company, 1932, pp. 1-3.*
1993, Integration of fossil and renewable energy technolgies to mitigrate carbon dioxide, S.W. Gouse, et al., Energy Conversion and Management, vol. 34, No. 9-11, pp. 1023-1030.
2002, Future prospects for production of methanol and hydrogen from biomass, Carlo N. Hamelinck et al., Journal of Power Sources, Elsevier Sequoia S.A. Lausanne, vol. 111, No. 1, pp. 1-22.
1999-2000, Methanol-Herstellung und Einsatz als Energieträger für Brennstoffzellen, von Joachim Pasel, et al., http:/www.fv-sonnenenergie.de/publikationen/th9900_46-53.pdf, pp. 46-53.

* cited by examiner

*Primary Examiner*—Jafar Parsa
(74) *Attorney, Agent, or Firm*—Jordan and Hamburg LLP

(57) ABSTRACT

The invention relates to a method and installation for producing liquid energy carriers from a solid carbon carrier by means of gasifying a solid carbon carrier. The installation is at least comprised of a drying device, a gasification apparatus, a synthesizing device for synthesizing the liquid energy carrier, a device for effecting the electrolysis of water for producing oxygen serving as a gasification agent and hydrogen for the synthesis process, and of a combustion apparatus, which is connected to the output of the gasification apparatus for carbon-containing gasification residues and to the oxygen outlet of the device for effecting the electrolysis of water. According to the invention, at least a portion of the waste steam from the drying device and at least a portion of the residual gas arising during synthesis are fed to the gasification process in the gasification apparatus. In addition, the carbon-containing residuals from the gasification apparatus and a portion of the oxygen produced in the device for effecting the electrolysis of water can be fed to a combustion apparatus, and the carbon dioxide-containing and oxygen-containing waste gas from the combustion apparatus can be fed to the combustion apparatus in the form of a gasification agent.

15 Claims, 1 Drawing Sheet

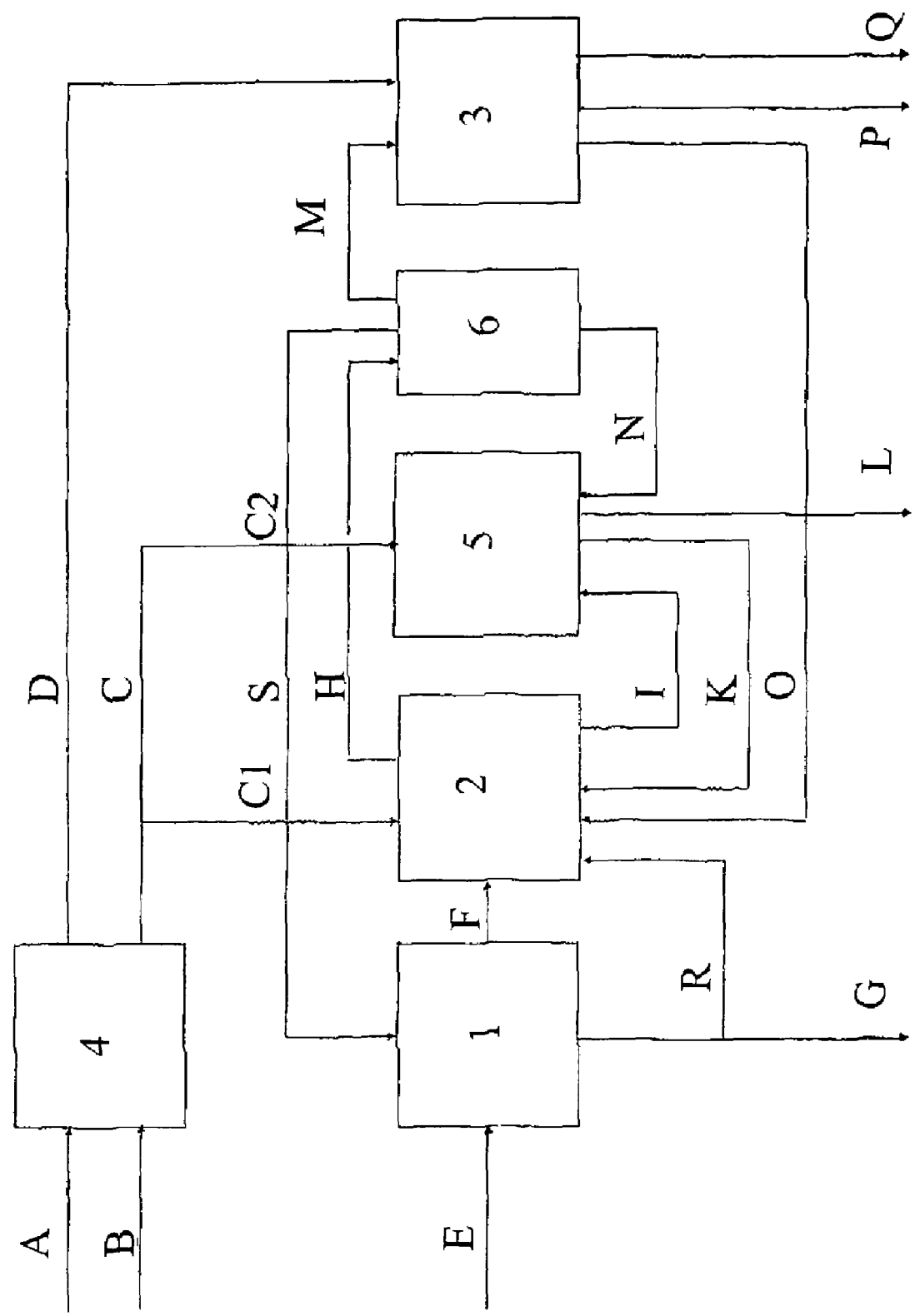

METHOD AND INSTALLATION FOR PRODUCING LIQUID ENERGY CARRIERS FROM A SOLID CARBON CARRIER

BACKGROUND

According to the prior art, a large number of processes for producing liquid energy carriers are known. For example, the German "ForschungsVerbund Sonnenenergie", a cooperation of nonuniversity research institutes, is carrying out research with the aim of discovering a lasting energy supply based on new technologies for utilizing renewable energy sources.

In "Methanol-Herstellung und Einsatz als Energieträger für Brennstoffzellen", http://www.fvsonnenenergie.de/publikationen/th9900/th9900_46-53.pdf J. Pasel et al describe methods of obtaining methanol. Methanol as an alternative fuel for the traffic sector offers the advantage of a considerable replacement potential for the fuels required today because renewable resources will play an important role in the longer term. Closed material circuits are given as a basic prerequisite for lasting energy systems. Inter alia, fossil raw materials or residues can be gasified with the introduction of energy from wind power, water power or solar power, with the oxygen required for gasification and hydrogen for the synthesis of methanol being produced in a parallel electrolysis.

SUMMARY OF THE INVENTION

The invention relates to a process and a plant for producing liquid energy carriers, in particular methanol, from a solid carbon carrier by means of gasification with introduction of external energy and production of a synthesis gas for subsequent syntheses.

The invention is intended, in particular, for use in a compact plant configuration. The liquid energy carriers as final products are energy stores and are intended for mobile or stationary work apparatuses. Such plants utilize, as additional energy, wind power, water power or solar power which have attracted considerable interest in view of limited resources, e.g. in the case of petroleum, and environmental consciousness which has increased recently.

BRIEF DESCRIPTION OF THE DRAWINGS

FIG. 1 shows a schematic of a plant for producing a liquid energy carrier from a solid carbon carrier.

DETAILED DESCRIPTION OF THE INVENTION

It is an object of the invention to provide a process for producing liquid energy carriers from a solid carbon carrier of the abovementioned type, which significantly increases with efficiency of such processes. Furthermore, a plant for producing liquid energy carriers from a solid carbon carrier, which has a compact construction and can be utilized for producing fuel for use in work engines for the operation of mobile or stationary work apparatuses, is to be provided.

As solid carbon carriers, it should be possible to use, in particular, ones having a reduced heating value, i.e. fossil or recent fuels such as biomass or brown coal which are characterized by a significant natural oxygen content and thus a certain oxidation state and as a result a lower heating value than low-oxygen fuels. Thus, for example, the molar carbon/oxygen ratio in wood is 1:1. The lower energy content resulting therefrom should be compensated by introduction of external energy of nonfossil origin and its storage as chemical energy in the energy carriers to be produced, with the minimization of the external energy consumption being a significant aspect of the object. A further aspect of the object is that the process should operate without significant process-related carbon dioxide emissions.

The invention achieves the object for the process and for the plant by means of the features indicated in the present description. Advantageous embodiments of the invention are characterized in the present description and are described below together with the description of the preferred performance of the invention, including the drawing.

The central aspect of the invention is the further development of a process for producing a liquid energy carrier from a synthesis gas in a compact plant by gasification of a solid carbon carrier. The compact plant comprises at least a drying apparatus for drying the carbon carrier, a gasification apparatus for gasifying the carbon carrier and for producing the synthesis gas, a synthesis apparatus for the synthesis of the liquid energy carrier from the synthesis gas and an apparatus for the electrolysis of water for producing oxygen as gasification agent for the gasification process in the gasification apparatus and hydrogen for the synthesis process in the synthesis apparatus.

According to the process, at least part of the off-vapor from the drying apparatus and at least part of the residual gas obtained in the synthesis is fed to the gasification process in the gasification apparatus. The off-vapor increases, in accordance with the thermodynamic water-gas equilibrium, the formation of hydrogen and the residual gas, which contains amounts of hydrogen and carbon monoxide, significantly increases the efficiency of the process.

In one embodiment, the carbon-containing residues from the gasification apparatus and part of the oxygen produced in the apparatus for the electrolysis of water are fed to the combustion process in a combustion apparatus which is arranged downstream of the gasification apparatus. The $CO_2$— and oxygen-containing offgas from the combustion apparatus is then advantageously fed as gasification agent to the gasification process in the gasification apparatus.

The drying process for the carbon carrier in the drying apparatus for producing an off-vapor which is free of incondensable components is, in accordance with one embodiment, carried out in a closed system and without entraining air.

The off-vapor from the drying apparatus which is not fed to the gasification process in the gasification apparatus can be condensed in a condenser and utilized externally as heat donor.

In further embodiments, the synthesis gas can be subjected to purification and/or cooling before introduction into the synthesis apparatus and the residues from the gas purification and/or the residual gas from the synthesis apparatus which are not fed to the gasification process in the gasification apparatus can be fed to the combustion process in the combustion apparatus.

The waste heat obtained in the gasification process and/or the synthesis of the liquid energy carrier and/or, if appropriate, the combustion process and/or the gas purification and cooling is advantageously introduced into the drying apparatus.

The inventive combination of the individual streams is overall characterized by introduction of energy of external origin which compensates the energy deficit corresponding to the natural oxidation state of the carbon carrier used and is present as stored energy in the end product. Recirculation of the residual gases to the product stream ensures virtually complete utilization of the carbon present in the carbon carrier used and an ash which can be deposited in a landfill is obtained.

The generation of additional energy is not a subject matter of the invention. However, in view of the objective to create a process for complete utilization of the carbon carrier and to largely avoid carbon dioxide emissions, this energy should not come from the combustion of fossil or recent fuels.

Insofar as it is relevant to the invention, the individual process steps will be briefly explained below.

The drying and work-up of the carbon carrier serves to increase the heating value, since this in the original state generally has a high water content and thus a low available heating value, and it is in principle possible to use all known drying methods. The degree of drying is selected as a function of the elemental composition of the carbon carrier and thus its energy content so that the subsequent gasification can be maintained autothermally. Depending on the type of solid carbon carrier used, at least part of the heat energy required for drying can also be taken from the gasification process.

In the embodiment of the invention with a downstream combustion apparatus, the carbon-containing solid gasification residue discharged from the gasification apparatus is reacted with introduction of oxygen to give a gas comprising carbon dioxide and excess oxygen. While a reducing atmosphere prevails in the gasification process, the combustion process is characterized by an oxidizing atmosphere.

The electrolysis of water to produce hydrogen and oxygen results in electric energy of external origin flowing into the process. The external energy to be introduced compensates the energy deficit of the oxygen-containing carbon carrier and is ultimately transformed into an energy content of the liquid energy carrier and thus converted into a storable form. This means that carbon carriers having a relatively high heating value, e.g. hard coal, can in principle also be processed by means of this process to give liquid energy carriers with storage of the external energy in the liquid products to be produced.

In the gas purification and cooling, the raw gas produced is cooled and brought to the purity required for the synthesis. The cooling of the raw gas produced deserves particular attention since the composition is temperature-dependent because of the Boudouard equilibrium, i.e. in the case of slower cooling, the carbon monoxide present in the gas is increasingly converted into carbon dioxide with deposition of carbon.

For this reason, it is advantageous to carry out cooling in a fluidized-bed apparatus in the plant of the invention. An inert fluidizable material which is fluidized by the gas to be cooled is present in this fluidized-bed apparatus. Owing to the pseudoliquid state of a fluidized bed, this has an almost uniform temperature. When the hot gas from the gasification is fed into the significantly cooler fluidized bed, shock-like cooling occurs and the undesirable conversion of carbon monoxide is avoided as a result.

A heat exchanger in the form of a tube heat exchanger, plate heat exchanger or other heat exchanger design is integrated into the fluidized-bed apparatus. Boiling water having a pressure which can be chosen freely within certain limits is present in the interior of this heat exchanger so that the heat removed from the hot gas is converted into the corresponding quantity of steam. Owing to the high heat transfer coefficient in the fluidized bed compared to a conventional gas cooler, the heat-exchange area necessary can be reduced by from 70 to 80%. The fluidized-bed apparatus simultaneously functions as a steam generator in which at least part of the heating steam required for drying of the carbon carrier is generated.

The fluidized-bed apparatus additionally serves as gas purification stage. As a result of the cooling, the tar and possibly dust present in the raw gas are deposited on the inert fluidizable material. Regeneration of the laden fluidizable material is carried out either by continuous or periodic removal of a substream, burning-off of the deposit and recirculation to the fluidizable-bed cooler. This regeneration of the inert fluidizable material is advantageously carried out in conjunction with the combustion of the carbon-containing residue from the gasification, as a result of which offgas emission is avoided and the carbon content is utilized. A further cooling step of a conventional type and a fine purification of the gas corresponding to the requirements of the synthesis step can subsequently be carried out.

In the synthesis, the raw gas which has been produced in the gasification and subsequently conditioned is converted into a liquid energy carrier. This synthesis can be, depending on requirements, a hydrocarbon synthesis known per se, e.g. of the Fischer-Tropsch type, a methanol synthesis or another synthesis, e.g. an isobutyl oil synthesis. Since the ratio of carbon monoxide to hydrogen required for these syntheses is not present in the raw gas from the gasification when a carbon monoxide conversion is not carried out but instead there is an excess of carbon monoxide, the hydrogen requirement is covered by addition of the hydrogen from the electrolysis of water and is set to the carbon monoxide:hydrogen ratio required for the synthesis.

Owing to the applicable thermodynamic laws, the known syntheses which have been mentioned above do not proceed completely in the direction of the chosen target product. A residual gas which comprises small amounts of unreacted hydrogen and carbon monoxide and also a thermodynamically determined proportion of carbon dioxide from the gasification and inert gas components from the carbon carrier remains.

The plant of the invention for producing a liquid energy carrier from a synthesis gas comprises at least a drying apparatus for drying the carbon carrier, a gasification apparatus for gasifying the carbon carrier, a synthesis apparatus for the synthesis of the liquid energy carrier from the synthesis gas and an apparatus for the electrolysis of water for producing oxygen as gasification agent for the gasification process in the gasification apparatus and hydrogen for the synthesis process in the synthesis apparatus and also a combustion apparatus which is connected to the outlet for carbon-containing gasification residues from the gasification apparatus and the oxygen outlet of the apparatus for the electrolysis of water.

The outlet for the off-vapor from the drying apparatus and/or the outlet for residual gas from the synthesis on the synthesis apparatus is/are connected to the gasification apparatus in one embodiment. In this way, off-vapor and residual gas from the synthesis can be introduced into the gasification process. At least one device for regulating the amount of off-vapor and/or residual gas is normally also present in this connection.

Furthermore, at least one apparatus for gas purification and/or cooling can be present between the gasification apparatus and/or the synthesis apparatus and/or the combustion apparatus. The apparatus for gas purification and/or cooling can be configured as a fluidized-bed apparatus with integrated steam generation and the outlet for the steam can be connected to an inlet for heating steam on the drying apparatus.

The waste heat from the gasification apparatus and/or the synthesis apparatus and/or the combustion apparatus can be collected by means of a waste heat collection apparatus and passed to the drying apparatus.

The advantage of the invention is, in particular, that the electric energy requirement, measured as a proportion of the energy content of the liquid energy carrier produced, can be reduced, e.g. in the case of methanol production from almost 100% to less than 50%, based on the energy content of the methanol produced.

It has been found that combined control of the introduction of the residual gas from the synthesis and the off-vapor from the drying of the carbon carrier enables the overall process to be realized in a largely closed system. The oxygen requirement for the gasification and the hydrogen requirement for the conditioning of the raw gas for the synthesis can be controlled so that the volume ratio is virtually 1:2 and thus corresponds to the formation ratio in the electrolysis of water. As a result, no excess quantities of oxygen are obtained from the electrolysis.

The provision of the electric energy from spontaneously changing natural resources can advantageously be combined with classically produced electric energy, with the major part of the energy always been obtained from wind power, water power or solar power.

Further advantages are the minimization of the $CO_2$ output and the virtually pollutant-free residues in the form of neutral ash.

EXAMPLE

The invention is illustrated below by means of an example. The associated FIG. 1 schematically shows a plant for producing a liquid energy carrier from a solid carbon carrier, including the streams according to the invention.

The plant comprises a steam fluidized-bed dryer 1 as drying apparatus for drying the carbon carrier, a fluidized-bed gasifier 2 as gasification apparatus for the gasification of the carbon carrier and for production of the synthesis gas, a synthesis apparatus 3 for the synthesis of the liquid energy carrier from the synthesis gas and an apparatus for the electrolysis of water 4. In addition, a fluidized-bed combustion plant 5 as combustion apparatus and a fluidized-bed cooler 6 as apparatus for gas purification and cooling are present in the specific plant.

All units are combined in a compact plant and connected to one another via appropriate lines. The individual streams are explained in more detail below with the description of the process of the invention.

For example, 4115 kg/h of mechanically prepared raw brown coil E having a heating value of 9605 kJ/kg and a water content of 55% by mass are fed as carbon carrier to the steam fluidized-bed dryer 1 and dried there to give 2184 kg/h of dry brown coal F having a residual water content of 15.2% by mass and a heating value of 20 250 kJ/kg.

The drying step has a heat requirement of 1831 kW. This heat is obtained within the plant in other units and introduced into the drying process. In the example, the heating steam S produced in the fluidized-bed cooler 6 as apparatus for gas purification and cooling is utilized.

Under the conditions described by way of example, 1931 kg/h of steam are formed during drying. Of this total amount, 1046 kg/h in a first substream R are, according to the invention, fed to the fluidized-bed gasifier 2. A second substream G of 885 kg/h is introduced into an off-vapor condenser, with the heat of condensation of 557 kW liberated there being able to be passed as low-temperature heat to an external use.

In parallel to the provision of the prepared solid carbon carrier and also off-vapor from drying for the gasification process, 799 kg/h of oxygen and 115 kg/h of hydrogen are produced from water A and introduced external electric energy B in the apparatus for the electrolysis of water 4. The electric energy requirement for this is 4.77 MW. In accordance with the objectives of the process, this energy is preferably obtained from water, wind or solar energy plants.

About one third of the oxygen C produced electrolytically is fed via stream C1 to the fluidized-bed gasifier 2 and two thirds are fed via stream C2 to the fluidized-bed combustion plant 5. The use of the hydrogen via stream D will be explained later.

In the fluidized-bed gasifier 2, a raw gas H is produced from the dry brown coal F with introduction of the oxygen via stream C1, with, according to the invention, the streams steam via substream R and a mixture K of carbon dioxide and oxygen from the fluidized-bed combustion plant 5 and a residual gas O from the synthesis in which residues of carbon monoxide and hydrogen from the synthesis apparatus 3 are present also flowing in. The gasification is carried out at a mean gasification temperature of 630° C. The residual gas O from the synthesis is introduced in an amount of 2369 kg/h.

In the example, purification of the raw gas H finally gives 5658 kg/h of pure gas M containing 27.5% by volume of carbon monoxide and 35.0% by volume of hydrogen. The remainder consists essentially of carbon dioxide and small amounts of water vapor and methane.

The carbon-containing gasification residue I from the fluidized-bed gasifier 2 and oxygen via stream C2 are fed into the fluidized-bed combustion plant 5 and reacted there under an oxidizing atmosphere to give a mixture K of carbon dioxide and oxygen. This gas mixture K is, as mentioned above, fed to the gasification process in the fluidized-bed gasifier 2. The streams are regulated so that a combustion temperature of 900° C. is maintained.

As waste product of the combustion process, only the ash L which is free of calcium sulfide and consequently does not tend to evolve hydrogen sulfide in the presence of moisture remains. The ash L can therefore be deposited in a landfill without problems.

The raw gas H is purified and cooled in the fluidized-bed cooler 6. An inert fluidizable material is present in the fluidized-bed cooler 6 and is kept in a fluidized state by the raw gas. A tube heat exchanger having a heat-exchange area of about 200 m$^2$ and in these tubes boiling water at 19° C. and 12.6 bar is present in the operating state dips into the fluidized bed. The usable heat is withdrawn from the raw gas H and a stream of steam having the same parameters is produced and is, as mentioned, fed as heating steam S to the steam fluidized-bed dryer 1. The fluidized-bed cooling simultaneously acts as gas purification since the condensing tar constituents and dust present in the raw gas are deposited on the inert fluidizable material on cooling of the gas from 630° C. to 230° C. The fluidizable material together with the residues from the gas purification N can be passed to the fluidized-bed combustion plant 5 for regeneration.

If the cooled synthesis gas M does not yet meet the requirements of the subsequent methanol synthesis, in particular adherence to the limit values for passage over the catalyst, appropriate measures corresponding to the prior art can be taken.

In the synthesis apparatus 3, the synthesis gas M is then reacted, with the volume ratio of hydrogen:carbon monoxide in the pure gas of about 2.05 required for the synthesis of methanol being ensured by introduction of the hydrogen via stream D from the apparatus for the electrolysis of water 4. The synthesis process forms essentially methanol and some by-products such as dimethyl ether and higher alcohols which can remain in the target product crude methanol Q.

A residual gas O from the synthesis in which residual amounts of carbon monoxide and hydrogen and also the carbon dioxide present in the synthesis gas and inert gas constituents are present is also obtained in the synthesis process. The residual gas O from the synthesis is, as indicated above, fed in an amount of 2369 kg/h to the fluidized-bed gasifier 2. A substream of the residual gas is removed from the system in an amount of 1276 kg/h as purge gas P in order to avoid accumulation of the inert gas constituents.

The overall result of the synthesis process is that raw methanol Q is produced in an amount of 1931 kg/h with a chemically bound power of 10 647 kW from 4115 kg/h of mechanically prepared raw brown coal E. Based on the power expended for the electrolysis, this is 223%.

LIST OF REFERENCE NUMERALS USED

1 Stream fluidized-bed dryer
2 Fluidized-bed gasifier
3 Synthesis apparatus
4 Apparatus for the electrolysis of water
5 Fluidized-bed combustion plant
6 Fluidized-bed cooler

LABELING OF THE STREAMS

A Water
B Electric energy
C Oxygen
C1 Oxygen of first stream
C2 Oxygen of second stream
D Hydrogen
E Raw brown coal
F Dry brown coal
G Off-vapor substream
H Raw gas
I Gasification residue
K Gas mixture
L Ash
M Pure gas
N Residues from gas purification
O Residual gas from the synthesis
P Purge gas
Q Raw methanol
R Off-vapor substream
S Heating steam

The invention claimed is:

1. A process for producing a liquid fuel comprising:
drying a solid carbon carrier in a drying apparatus,
producing oxygen and hydrogen in an apparatus for electrolysis of water,
supplying said oxygen as a gasification agent to a gasification apparatus and gasifying the carbon carrier in said gasification apparatus to produce a synthesis gas,
supplying said hydrogen and said synthesis gas to a synthesis apparatus and synthesizing the liquid fuel in said synthesis apparatus from said synthesis gas, and
feeding at least part of off-vapor from the drying apparatus and at least part of residual gas obtained in the synthesis apparatus to the gasification process in the gasification apparatus.

2. The process as claimed in claim 1, further comprising feeding carbon-containing residues from the gasification apparatus and part of the oxygen produced in the apparatus for the electrolysis of water to a combustion process in a combustion apparatus.

3. The process as claimed in claim 1 or 2, wherein the solid carbon carrier is one which has a reduced heating value and is, in accordance with its starting structure, conditioned to a required extent before introduction into the drying apparatus.

4. The process as claimed in claim 2, further comprising feeding a $CO_2$— and oxygen-containing offgas from the combustion apparatus as gasification agent to the gasification apparatus.

5. The process as claimed in claim 1 or 2, wherein said drying is carried out to thereby produce off-vapor being free of incondensable components, and said drying process is carried out in a closed system and without entraining air.

6. The process as claimed in claim 1 or 2, further comprising condensing in a condenser off-vapor from the drying apparatus which is not fed to the gasification process in the gasification apparatus.

7. The process as claimed in claim 1 or 2, further comprising purifying and/or cooling the synthesis gas before introduction of the synthesis gas into the synthesis apparatus.

8. The process as claimed in claim 2, further comprising purifying and/or cooling the synthesis gas before introduction of the synthesis gas into the synthesis apparatus, and feeding residues from the gas purification and/or residual gas from the synthesis apparatus not fed to the gasification process in the gasification apparatus to the combustion process in the combustion apparatus.

9. The process as claimed in claim 2, further comprising purifying and/or cooling the synthesis gas before introduction of the synthesis gas into the synthesis apparatus, and introducing waste heat obtained in the gasification process and/or the synthesis of the liquid fuel and/or the combustion process and/or the gas purification and gas cooling into the drying apparatus.

10. The process as claimed in claim 2, wherein the gasification apparatus is connected to an outlet of the synthesis apparatus, said outlet being an outlet for a residual gas from the synthesis apparatus.

11. The process as claimed in claim 2, further comprising providing an apparatus for gas purification and/or cooling positioned between the gasification apparatus and the combustion apparatus and/or between the combustion apparatus and the synthesis apparatus.

12. The process as claimed in claim 11, wherein said apparatus for gas purification and/or cooling comprises a fluidized-bed apparatus with integrated steam generation and a steam outlet connected to a heating steam inlet of the drying apparatus.

13. The process as claimed in claim 2, further comprising providing a waste heat collection apparatus which collects waste heat from the gasification apparatus and/or the synthesis apparatus and/or the combustion apparatus and passes it to the drying apparatus.

14. The process as claimed in claim 2, further comprising providing an outlet for off-vapor from the drying apparatus and/or an outlet for residual gas from the synthesis apparatus connected to the gasification apparatus through a device for regulating an amount of the off-vapor and/or the residual gas.

15. The process as claimed in claim 2, further comprising removing ash from the combustion apparatus.

* * * * *